United States Patent
Hayashi

(10) Patent No.: US 10,911,077 B2
(45) Date of Patent: Feb. 2, 2021

(54) ENCODER AND DATA TRANSMISSION METHOD

(71) Applicant: FANUC CORPORATION, Tamanashi (JP)

(72) Inventor: Takurou Hayashi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/532,704

(22) Filed: Aug. 6, 2019

(65) Prior Publication Data

US 2020/0052728 A1 Feb. 13, 2020

(30) Foreign Application Priority Data

Aug. 8, 2018 (JP) .................................. 2018-149078

(51) Int. Cl.
*H04B 1/04* (2006.01)
*G05B 19/402* (2006.01)

(52) U.S. Cl.
CPC ............. *H04B 1/04* (2013.01); *G05B 19/402* (2013.01); *G05B 2219/36489* (2013.01)

(58) Field of Classification Search
CPC ....................................................... H04B 1/04
USPC ........................................................ 375/295
See application file for complete search history.

(56) References Cited

U.S. PATENT DOCUMENTS

| 9,038,597 | B2* | 5/2015 | Fukuoka | F02D 11/107 |
| | | | | 123/396 |
| 2002/0111172 | A1* | 8/2002 | DeWolf | G06Q 30/02 |
| | | | | 455/456.3 |
| 2010/0263983 | A1* | 10/2010 | Nireki | B65H 9/101 |
| | | | | 194/202 |
| 2016/0094336 | A1* | 3/2016 | Schenzinger | H04L 25/4908 |
| | | | | 375/295 |

FOREIGN PATENT DOCUMENTS

| JP | 562242816 A | 10/1987 |
| JP | 2001143186 A | 5/2001 |
| JP | 2007041735 A | 2/2007 |
| JP | 200890825 A | 4/2008 |
| JP | 2009300354 A | 12/2009 |
| JP | 2012004815 A | 1/2012 |

(Continued)

OTHER PUBLICATIONS

English Machine Translation for Japanese Publication No. 2008-090825 A, published Apr. 17, 2008, 8 pgs.

(Continued)

*Primary Examiner* — Lihong Yu
(74) *Attorney, Agent, or Firm* — Fredrikson & Byron, P.A.

(57) ABSTRACT

An encoder that receives, from a control device, a request signal for requesting position data and transmits a response signal including the position data to the control device by serial communication, at a predetermined communication cycle, includes: a response signal generating unit configured to generate a response signal including the position data and associated data associated with the position data; and a (Continued)

transmitting unit configured to transmit the generated response signal. The transmitting unit is configured to transmit the associated data prior to transmission of the position data when transmitting the response signal.

6 Claims, 3 Drawing Sheets

(56) References Cited

FOREIGN PATENT DOCUMENTS

| | | | |
|---|---|---|---|
| JP | 2015106879 A | 6/2015 |
| JP | 2016189159 A | 11/2016 |
| JP | 2016217950 A | 12/2016 |
| WO | 0014483 A1 | 3/2000 |

OTHER PUBLICATIONS

English Abstract and Machine Translation for Japanese Publication No. JPS62-242816A, published Oct. 23, 1987, 7 pgs.
English Abstract and Machine Translation for International Publication No. WO00/014483A1, published Mar. 16, 2000, 12 pgs.
English Abstract and Machine Translation for Japanese Publication No. JP2001-143186A, published May 25, 2001, 24 pgs.
English Abstract and Machine Translation for Japanese Publication No. JP2007-041735A, published Feb. 15, 2007, 6 pgs.
English Abstract and Machine Translation for Japanese Publication No. JP2012-004815A, published Jan. 5, 2012, 21 pgs.
English Abstract and Machine Translation for Japanese Publication No. JP2015-106879A, published Jun. 8, 2015, 11 pgs.
English Abstract and Machine Translation for Japanese Publication No. JP2016-189159A, published Nov. 4, 2016, 11 pgs.
English Abstract and Machine Translation for Japanese Publication No. JP2009-300354A, published Dec. 24, 2009, 14 pgs.
English Abstract and Machine Translation for Japanese Publication No. JP2016-217950A, published Dec. 22, 2016, 26 pgs.

* cited by examiner

ENCODER AND DATA TRANSMISSION METHOD

CROSS-REFERENCE TO RELATED APPLICATION

This application is based upon and claims the benefit of priority from Japanese Patent Application No. 2018-149078 filed on Aug. 8, 2018, the contents of which are incorporated herein by reference.

BACKGROUND OF THE INVENTION

Field of the Invention

The present invention relates to an encoder and a data transmission method.

Description of the Related Art

As disclosed in Japanese Laid-Open Patent Publication No. 2008-090825, in serial communication between an encoder (position detector) for detecting a rotation angle or the like (position) of a motor and a control device (controller) such as a servo amplifier for controlling the encoder, when the encoder receives a request signal (transmission request) involving a request for position data indicative of a rotational position or the like, from the control device, the encoder transmits a response signal including position data (positional information) to the control device.

SUMMARY OF THE INVENTION

The request signal and the response signal are exchanged between the control device and the encoder in a fixed communication cycle. There are cases where the communication cycle is shortened to improve the responsiveness of the encoder to the control device. In this case, the time for generating the position data of the encoder must be shortened, so that there may occur a problem that generation of the position data cannot be completed in time before the start of transmission of the position data. To deal with this situation, an expensive A/D converter and the like capable of executing high-speed processing may be required to shorten the calculation time of the rotational position and the like.

It is therefore an object of the present invention to provide an encoder and a data transmission method which are capable of transmitting and receiving data in a shortened communication cycle with a less expensive configuration.

A first aspect of the present invention resides in an encoder for receiving a request signal for requesting position data from a control device and transmits a response signal including the position data to the control device by serial communication, at a predetermined communication cycle, including: a response signal generating unit configured to generate a response signal including the position data and associated data associated with the position data; and a transmitting unit configured to transmit the generated response signal. The transmitting unit is configured to transmit the associated data prior to transmission of the position data when transmitting the response signal.

A second aspect of the present invention resides in a data transmission method implemented by an encoder for receiving a request signal for requesting position data from a control device and transmitting a response signal including the position data to the control device by serial communication, at a predetermined communication cycle, including: a response signal generation step of generating a response signal including the position data and associated data associated with the position data; and a transmission step of transmitting the generated response signal. The transmission step transmits the associated data prior to transmission of the position data when transmitting the response signal.

According to the present invention, it is possible with a less expensive configuration to transmit and receive data in a shortened communication cycle.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An encoder and data transmission method according to the present invention will be detailed below by describing a preferred embodiment with reference to the accompanying drawings.

Embodiment

Figure 1:
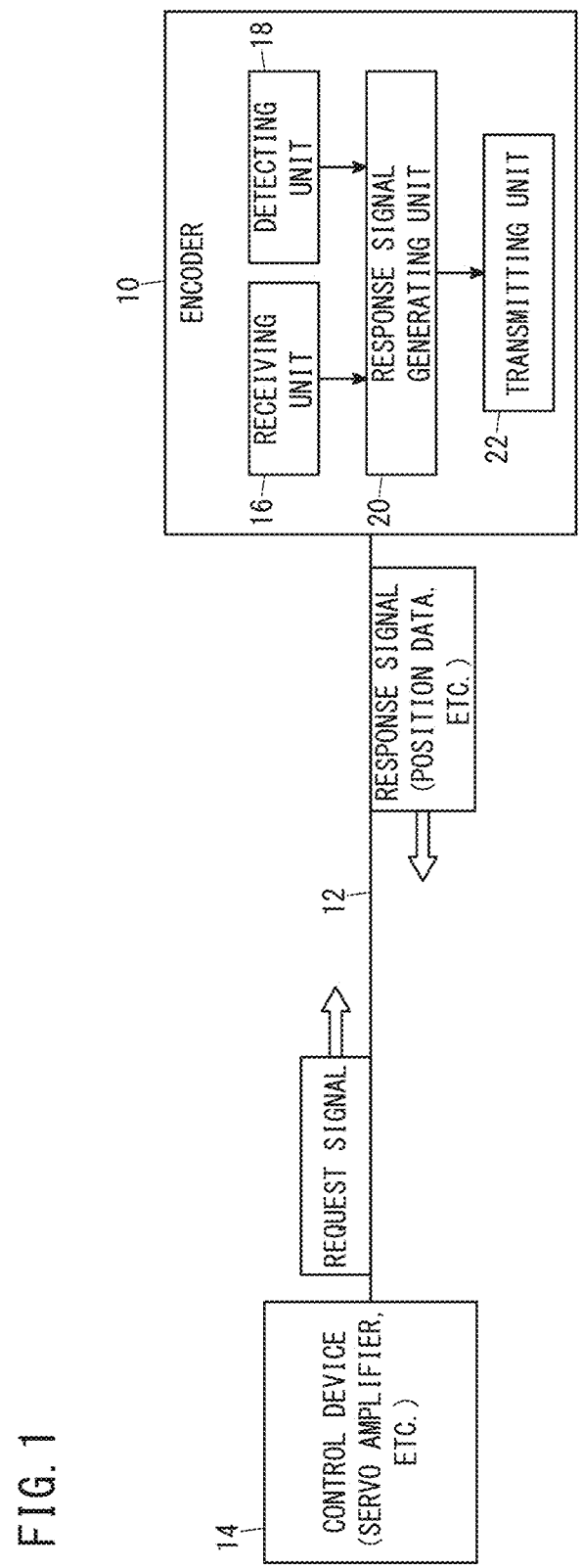
FIG. 1 is a diagram for explaining the function of an encoder according to an embodiment.

FIG. 1 is a diagram for explaining the function of an encoder 10 according to the present embodiment. The encoder 10 is connected to a control device 14 such as a servo amplifier via a transmission circuit 12 that transmits various pieces of information by serial communication. When the encoder 10 receives a request signal indicating a request for position data from the control device 14, the encoder 10 calculates the rotational position etc., of a motor, which is one of the measurement targets, and transmits a response signal including the position data indicating the calculated position to the control device 14. Exchange (transmitting and receiving) of the request signal and the response signal between the encoder 10 and the control device 14 is performed in a fixed communication cycle. Hereinbelow, the rotational position or the like of the motor to be measured is also referred to as the position.

In order to realize the above-described function, the encoder 10 includes a receiving unit 16, a detecting unit 18, a response signal generating unit 20, a transmitting unit 22, and others.

The receiving unit 16 and the transmitting unit 22 may be configured of an integrated circuit such as a custom LSI (Large Scale Integrated Circuit), a processor such as a CPU (Central Processing Unit), a MPU (Micro Processing Unit)

or the like, a memory such as ROM (Read Only Memory) or RAM (Random Access Memory) and various interface circuits for communication. The integrated circuit executes processing based on a predesigned electronic circuit, or the processor executes processing using a program and various pieces of information stored in the memory, to achieve the functions of the receiving unit 16 and the transmitting unit 22 via various interfaces. The detecting unit 18 is a detection circuit including a detection element such as a magnetoresistive element or a light receiving element. The response signal generating unit 20 can be configured of, for example, an integrated circuit such as a custom LSI, a processor such as a CPU or MPU, a memory such as ROM or RAM, an A/D converter (Analog-to-Digital Converter) that converts analog signals into digital signals, and others. The integrated circuit executes processing based on a predesigned electronic circuit, or the processor executes processing using a program and various pieces of information stored in the memory, to realize the data generation function of the response signal generating unit 20, which will be described later.

The receiving unit 16 receives a request signal that is transmitted from the control device 14 via the transmission circuit 12, using serial communication. The detecting unit 18 detects the position of the motor to be measured, and generates an analog signal indicating the position.

When the encoder 10 receives a request signal from the control device 14, the response signal generating unit 20 latches the analog signal at a timing synchronized with the request signal, and converts the analog signal into a digital signal. The response signal generating unit 20 generates position data indicating the position of the motor using the converted digital signal.

The response signal generating unit 20 generates associated data to be transmitted together with the position data to the control device 14. Examples of the associated data may include non-urgent data, data that is constantly acquired by the encoder 10, data that is obtained in the process of generating position data, and the like. The response signal generating unit 20 performs a process of generating associated data other than the associated data obtained in the process of generating position data, in parallel with the process of generating position data.

In order to transmit the position data and the associated data to the control device 14 by serial communication, the transmitting unit 22 generates serial data from these pieces of data and transmits the generated serial data to the control device 14. The serial data generated from the position data will also be referred to hereinbelow as position data. Also, the serial data generated from associated data will be also referred to hereinbelow as associated data.

The transmitting unit 22 transmits the associated data to the control device 14 prior to the transmission of the position data. The response signal generating unit 20 continues to execute the generating process of the position data while the transmitting unit 22 is transmitting the associated data to the control device 14.

After transmission of associated data, the transmitting unit 22 starts transmission of the position data at a start time of transmission of position date (also referred to as transmission start time) which has been previously determined.

When generation of the position data by the response signal generating unit 20 has not yet been completed at the transmission start time, the transmitting unit 22 transmits a specific signal indicating an abnormality (also referred to as an abnormality signal) to the control device 14. The transmitting unit 22 may transmit the abnormality signal together with the position data that has been generated up to the transmission start time by the response signal generating unit 20, or may transmit the abnormality signal instead of the position data. Next, how the encoder 10 performs data transmission processing will be described.

Figure 2:
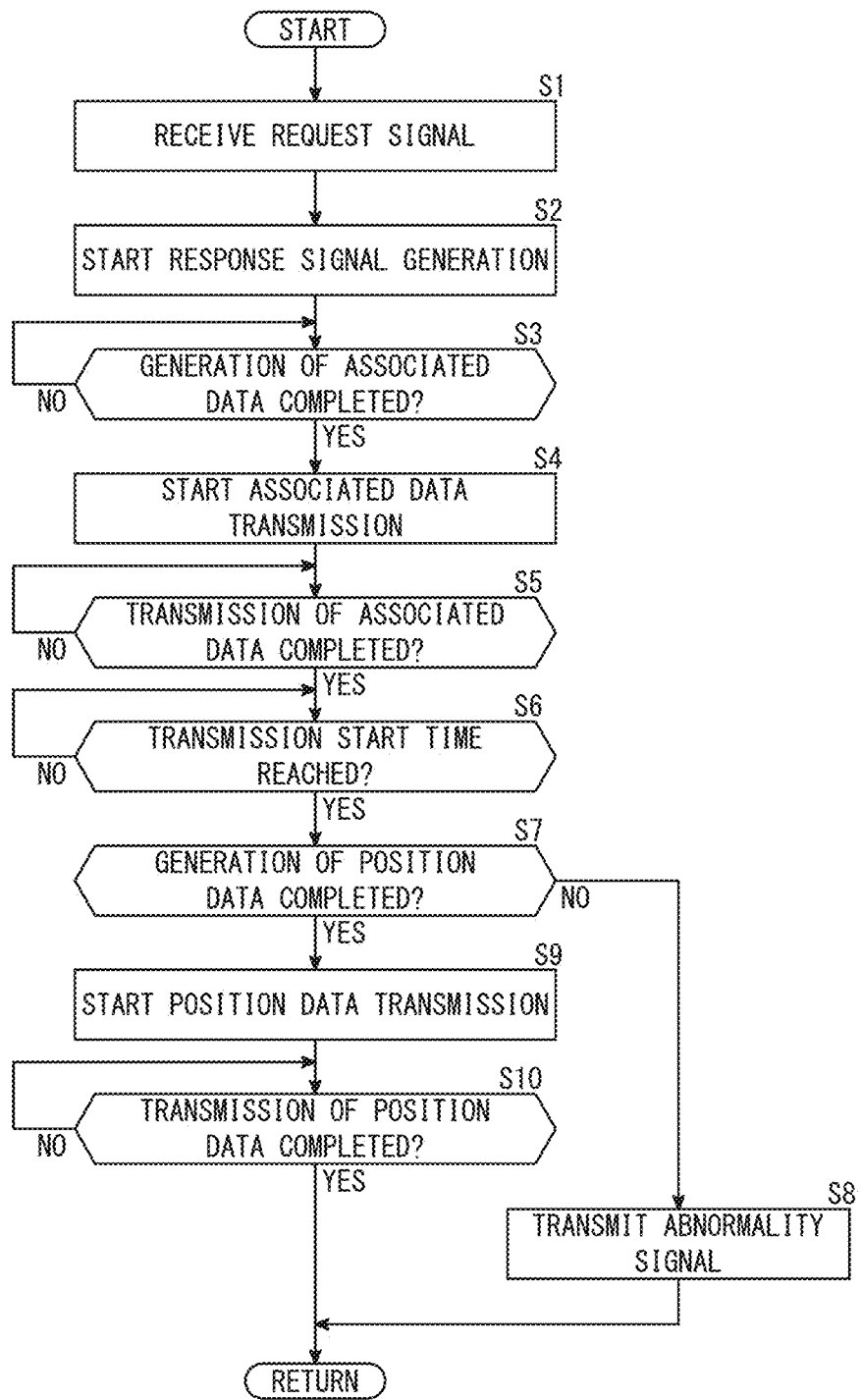
FIG. 2 is a flowchart illustrating an example of data transmission processing by an encoder according to the embodiment.

FIG. 2 is a flowchart showing an example of data transmission processing by the encoder 10 according to the present embodiment. The data transmission processing is repeated at a fixed communication cycle.

At step S1, when the receiving unit 16 receives a request signal from the control device 14, the response signal generating unit 20 starts a process of generating a response signal at step S2.

At step S3, the response signal generating unit 20 determines whether or not generation of associated data is completed. If generation of the associated data has not been completed (step S3: NO), the control of the encoder 10 stays at step S3. If generation of the associated data is completed (YES at step S3), the transmitting unit 22 starts transmission of the associated data to the control device 14 at step S4.

At step S5, the transmitting unit 22 determines whether or not transmission of associated data is completed. When transmission of the associated data has not been completed (step S5: NO), the control of the encoder 10 stays at step S5. When transmission of the associated data is completed (step S5: YES), the transmitting unit 22 determines whether or not the transmission start time has been reached at step S6. If the transmission start time has not been reached (step S6: NO), the control of the encoder 10 stays at step S6. If the transmission start time has been reached (step S6: YES), the response signal generating unit 20 determines at step S7 whether or not generation of position data is completed.

If generation of the position data has not been completed (step S7: NO), the transmitting unit 22 transmits an abnormality signal to the control device 14 at step S8. When generation of the position data is completed (step S7: YES), the transmitting unit 22 starts transmission of the position data to the control device 14 at step S9.

At step S10, the transmitting unit 22 determines whether or not transmission of the position data is completed. When transmission of the position data has not been completed (step S10: NO), the control of the transmitting unit 22 stays at step S10. When transmission of the position data is completed (step S10: YES), the control of the encoder 10 in the current communication cycle is ended.

Figure 3A:
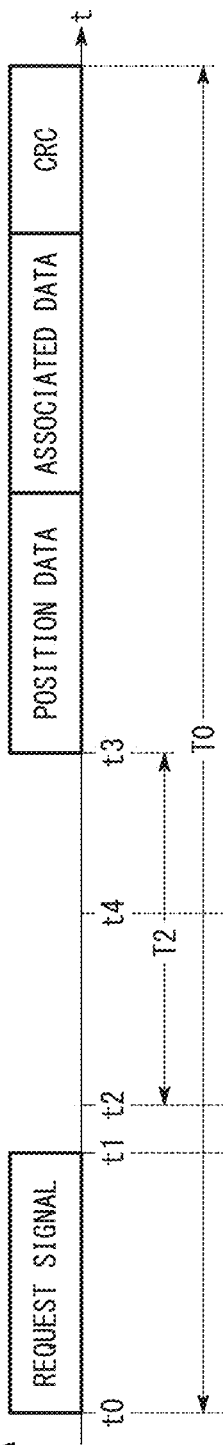
FIG. 3A is a diagram for explaining communication of data in a case of using an encoder according to the related art.
Figure 3B:
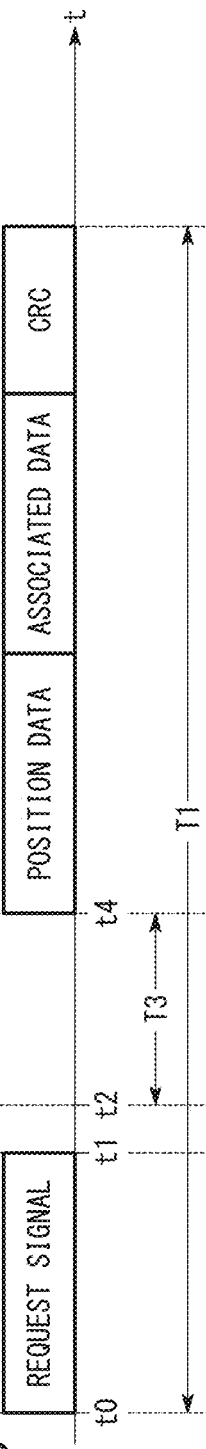
FIG. 3B is a diagram for explaining communication of data in a case of using an encoder according to the related art.
Figure 3C:
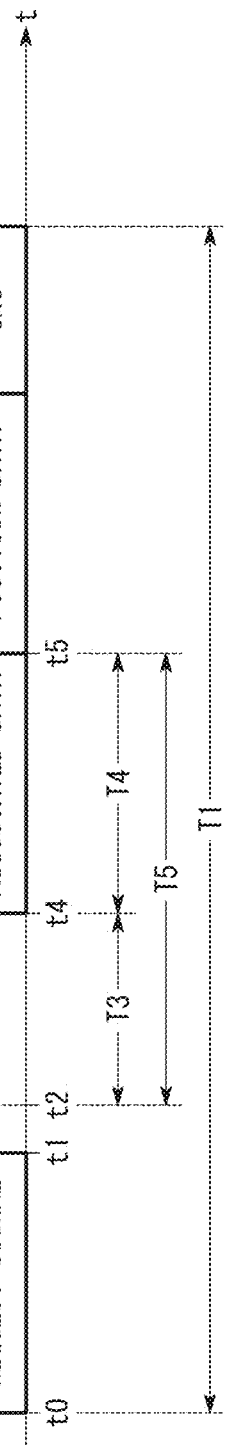
FIG. 3C is a diagram for explaining communication of data in a case of using an encoder according to the embodiment.

FIGS. 3A and 3B are diagrams for explaining data communication in a case of using an encoder according to the related art. FIG. 3C is a diagram for explaining data communication when the encoder according to the present embodiment is used. In FIGS. 3A to 3C, CRC (Cyclic Redundancy Check) means an error-detecting code. The associated data is data other than the position data and the CRC.

As shown in FIGS. 3A and 3B, the encoder according to the related art transmits the position data prior to transmission of the associated data. As shown in FIG. 3C, the encoder 10 according to the present embodiment transmits the associated data prior to transmission of the position data. FIG. 3A shows communication in a case where data communication is performed at a sufficiently long cycle T0. FIG. 3B and FIG. 3C show cases where data communication is performed at a cycle T1, which is shorter than the cycle T0.

As shown in FIGS. 3A to 3C, it is assumed that the encoder 10 and the encoder according to the related art start a request signal receiving process at time t0 and end the request signal receiving process at time t1. It is also assumed that after the reception of a request signal, the encoder 10 and the encoder according to the related art latch the analog signal generated by the detecting unit 18 at time t2 that is synchronized with the request signal and start generating a response signal. The time to start transmission of the response signal may be determined based on the communication cycle and the time required for transmitting the response signal; it is assumed herein that transmission of the response signal is started at time t3 in the case of FIG. 3A, and at time t4 that is earlier than the time t3 in the cases of FIGS. 3B and 3C.

The period of time T3 (T3=t4−t2) from the start of position data generation to the transmission start time in FIG. 3B is shorter than the period of time T2 (T2=t3−t2) from the start of position data generation to the transmission start time in FIG. 3A. Therefore, if the processing speed for generating position data in the case where the communication cycle is short as in FIG. 3B, is as low as that for generating position data in the case where the communication cycle is long as in FIG. 3A, the position data is not ready for transmission so that the position date cannot be transmitted at the designated transmission start time. To overcome this situation, the processing speed of the encoder for generating position data when the communication cycle is short as in FIG. 3B must be set higher than that of the encoder for generating position data when the communication cycle is long as shown in FIG. 3A. Thus, as the communication cycle is shortened, the encoder needs more expensive equipment such as the A/D converter that can execute high-speed processing.

Here, as shown in FIG. 3C, in the case of the encoder 10 according to the present embodiment which transmits associated data first, transmission of the position data is started at time t5, which is a period of time T4 taken for transmission of the associated data, behind time t4. That is, the response signal generating unit 20 can generate position data during the period of time T5 from time t2 to time t5. Thus, even if the communication cycle is shortened, no devices such as a high-speed A/D converter, which would be required in the case of FIG. 3B, are needed.

Thus, the encoder 10 of the present embodiment is configured such that the transmitting unit 22 transmits the associated data earlier than the position data, whereby the response signal generating unit 20 can secure the time for generation of the position data while the associated data is being transmitted, without use of an expensive A/D converter or the like. Therefore, even if the communication cycle is shortened, it is possible to transmit the position data at the transmission start time, hence achieve improved response performance.

In addition, when generation of position data is not completed at the transmission start time for some reason, an abnormality signal is transmitted from the encoder 10 to the control device 14 so that the control device 14 can quickly detect an abnormality.

The following variation can be made to the above embodiment.

[Modification]

The encoder 10 according to a modification transmits an abnormality signal to the control device 14 when an abnormality occurs in the generation process of position data. The response signal generating unit 20 in the encoder 10 of the modification detects the abnormality when an abnormality occurs in the generation process of position data. The transmitting unit 22 transmits an abnormality signal to the control device 14. Here, the abnormality signal herein may be a signal that is different from the abnormality signal in the above embodiment. For example, the abnormality signal in the above embodiment may be a specific signal indicating that the generation of position data was not completed in time for the transmission start time, whereas the abnormality signal in this modification may be a specific signal indicating that there was an abnormality in the process of generating position data.

According to the encoder 10 according to this modification, when a problem occurs in the generation process of position data, the control device 14 can quickly grasp the information.

Technical Ideas Obtained from the Embodiment

The technical ideas that can be grasped from the above embodiment will be described below.

<First Technical Idea>

The encoder (10) for receiving a request signal for requesting position data from a control device (14) and transmitting a response signal including the position data to the control device (14) by serial communication, at a predetermined communication cycle (T0, T1), includes: a response signal generating unit (20) configured to generate a response signal including the position data and associated data associated with the position data; and a transmitting unit (22) configured to transmit the generated response signal. The transmitting unit (22) is configured to transmit the associated data prior to transmission of the position data when transmitting the response signal.

Owing to the above, with a less expensive configuration, it is possible to transmit and receive data while shortening the communication cycle.

The transmitting unit (22) in the encoder (10) may be configured to transmit an abnormality signal to the control device (14) if generation of the position data by the response signal generating unit (20) has not been completed by a predetermined transmission start time (t5) of the position data. With this configuration, when generation of position data is not completed at the transmission start time (t5), the control device (14) can quickly detect an abnormality.

The transmitting unit (22) in the encoder (10) may be configured to transmit an abnormality signal to the control device (14) if an abnormality is detected in the process of generating the position data. As a result, when there occur any problems in the generation process of the position data, the control device (14) can quickly detect the abnormality.

<Second Technical Idea>

A data transmission method implemented by an encoder (10) for receiving a request signal for requesting position data from a control device (14) and transmitting a response signal including the position data to the control device (14) by serial communication, at a predetermined communication cycle (T0, T1), includes: a response signal generation step of generating a response signal including the position data and associated data associated with the position data; and a transmission step of transmitting the generated response signal. The transmission step transmits the associated data prior to transmission of the position data when transmitting the response signal.

Owing to the above, with a less expensive configuration, it is possible to transmit and receive data while shortening the communication cycle.

The transmission step may transmit an abnormality signal to the control device (14) if generation of the position data at the response signal generation step has not been completed by a predetermined transmission start time (t5) of the position data. With this configuration, when generation of position data is not completed at the transmission start time (t5), the control device (14) can quickly detect an abnormality.

The transmission step may transmit an abnormality signal to the control device (14) if an abnormality is detected in the process of generating the position data. As a result, when there occur any problems in the generation process of the position data, the control device (14) can quickly detect the abnormality.

The present invention is not particularly limited to the embodiment described above, and various modifications are possible without departing from the essence and gist of the present invention.

What is claimed is:

1. An encoder configured to receive, from a control device, a request signal for requesting position data and transmit a response signal including the position data to the control device by serial communication, at a predetermined communication cycle, comprising:
   a response signal generating unit configured to generate a response signal including the position data and associated data associated with the position data; and
   a transmitting unit configured to transmit the generated response signal,
   wherein the transmitting unit is configured to transmit, of the position data and the associated data transmitted within one and the same communication cycle, the associated data prior to the position data when transmitting the response signal,
   wherein the response signal generating unit continues to generate the position data while transmitting the associated data to the control device,
   wherein the associated data includes at least one of data that the encoder acquires other than the position data, and data that is obtained in a process of generating the position data.

2. The encoder according to claim 1, wherein the transmitting unit is configured to transmit an abnormality signal to the control device if generation of the position data by the response signal generating unit has not been completed by a predetermined transmission start time of the position data.

3. The encoder according to claim 1, wherein the transmitting unit is configured to transmit an abnormality signal to the control device if an abnormality has been detected in a process of generating the position data.

4. A data transmission method implemented by an encoder configured to receive, from a control device, a request signal for requesting position data and transmit a response signal including the position data to the control device by serial communication, at a predetermined communication cycle, comprising:
   a response signal generation step of generating a response signal including the position data and associated data associated with the position data; and
   a transmission step of transmitting the generated response signal,
   wherein the transmission step transmits, of the position data and the associated data transmitted within one and the same communication cycle, the associated data prior to the position data when transmitting the response signal, wherein the response signal generating step continues to generate the position data while the transmission step continues to transmit the associated data to the control device,
   wherein the associated data includes at least one of data that the encoder acquires other than the position data, and data that is obtained in a process of generating the position data.

5. The data transmission method according to claim 4, wherein the transmission step transmits an abnormality signal to the control device if generation of the position data at the response signal generation step has not been completed by a predetermined transmission start time of the position data.

6. The data transmission method according to claim 4, wherein the transmission step transmits an abnormality signal to the control device if an abnormality has been detected in a process of generating the position data.

* * * * *